United States Patent [19]

Welton

[11] Patent Number: 4,794,860
[45] Date of Patent: Jan. 3, 1989

[54] FOAM CONTROL METHOD FOR VACUUM REFINING OF GLASSY MATERIALS

[75] Inventor: Wright M. Welton, Oldtown, Md.

[73] Assignee: PPG Industries, Inc., Pittsburgh, Pa.

[21] Appl. No.: 102,227

[22] Filed: Sep. 29, 1987

Related U.S. Application Data

[63] Continuation-in-part of Ser. No. 882,647, Jul. 7, 1986, abandoned.

[51] Int. Cl.⁴ .............................................. C03B 5/225
[52] U.S. Cl. ....................................... 65/135; 65/136; 65/27
[58] Field of Search ................... 65/134, 135, 136, 17, 65/27

[56] References Cited

U.S. PATENT DOCUMENTS

| | | |
|---|---|---|
| 805,139 | 11/1905 | Hitchcook . |
| 1,564,235 | 12/1925 | Harrington . |
| 1,598,308 | 8/1926 | Pike . |
| 2,465,283 | 3/1949 | Schlehr . |
| 2,781,411 | 2/1957 | Geffcken et al. . |
| 2,877,280 | 3/1959 | Eden . |
| 3,338,694 | 8/1967 | Davy . |
| 3,350,185 | 10/1967 | Rough ..................... 65/32 |
| 3,429,684 | 2/1969 | Plumat . |
| 3,442,622 | 5/1969 | Monnier et al. . |
| 3,519,412 | 7/1970 | Olink ..................... 65/337 |
| 4,195,982 | 4/1980 | Coucoulas et al. ........ 65/134 |
| 4,339,254 | 7/1982 | Gridley . |
| 4,381,934 | 5/1983 | Kunkle et al. ............. 65/135 |
| 4,529,428 | 7/1985 | Groetzinger ............... 65/27 |
| 4,551,161 | 11/1985 | Savolskis et al. ........... 65/27 |

FOREIGN PATENT DOCUMENTS

| | | |
|---|---|---|
| 278052 | 12/1970 | U.S.S.R. . |
| 530000 | 11/1976 | U.S.S.R. . |
| 654141 | 10/1951 | United Kingdom . |

Primary Examiner—Arthur Kellogg
Attorney, Agent, or Firm—Dennis G. Millman

[57] ABSTRACT

In a process for refining molten glass or the like by vacuum, the collapse of foam is accelerated by contacting the foam with foam breaking substances. The foam breaking substances include water, alkali metal compounds such as sodium hydroxide or sodium carbonate, and solutions of such compounds.

25 Claims, 1 Drawing Sheet

FOAM CONTROL METHOD FOR VACUUM REFINING OF GLASSY MATERIALS

This is a continuation-in-part application of Ser. No. 882,647 filed on July 7, 1986 now abandoned.

BACKGROUND OF THE INVENTION

The present invention relates to the use of subatmospheric pressure to expedite refining of molten glass or the like. More particularly, the invention relates to a practical arrangement for controlling the amount of foaming in such a refining technique.

In the melting of glass, substantial quantities of gas are produced as a result of decomposition of batch materials. Other gases are physically entrained by the batch materials or are introduced into the melting glass from combustion heat sources. Most of the gas escapes during the initial phase of melting, but some become entrapped in the melt. Some of the trapped gas dissolves in the glass, but other portions form discrete gaseous inclusions known as bubbles or "seeds" which would be objectionable if permitted to remain in unduly high concentrations in the product glass. The gas inclusions will rise to the surface and escape from the melt if given sufficient time in the stage of a melting operation known as "refining" or "fining." High temperatures are conventionally provided in the refining zone to expedite the rise and escape of the gaseous inclusions by reducing the viscosity of the melt and by enlarging the bubble diameters. The energy required for the high temperatures employed in the refining stage and the large melting vessel required to provide sufficient residence time for the gaseous inclusions to escape from the melt are major expenses of a glass making operation. Accordingly, it would be desirable to assist the refining process to reduce these costs.

It has been known that reduced pressure could assist the refining process by reducing the partial pressure of the included gaseous species and by increasing the volume of bubbles within the melt so as to speed their rise to the surface. The impracticality of providing a gastight vessel on the scale of a conventional refining chamber so as to draw a vacuum therein has limited the use of vacuum refining to relatively small scale batch operations such as disclosed in U.S. Pat. Nos. 1,564,235; 2,781,411; 2,877,280; 3,338,694; and 3,442,622.

Continuous vacuum refining processes have been proposed but have not found acceptance for large scale, continuous manufacture of glass due to various drawbacks. In the continuous vacuum refining arrangements shown in U.S. Pat. Nos. 805,139; 1,598,308; and 3,519,412 a major disadvantage is the requirement for relatively narrow vertical passageways leading into and out of the vacuum zone necessitated by the pressure difference. These passageways complicate the construction of such a vessel, particularly in view of the requirement for gas-tight walls, increase the exposure of the throughput to contaminating refractory contact, and impose a significant viscous drag to the throughput flow. It may be noted that a column of glass of about 4.5 meters is required to balance a vacuum of one-half atmosphere. Varying the output of such a system is also a problem, particularly in view of the viscous drag factor. Variability is important in a continuous commercial operation due to changes in the product being made and economic factors that affect the rate of production desired. In each of the three patents noted above, the driving force for increasing the rate of flow through the passages of the vacuum section can be provided only by increasing the depth of the melt upstream of the vacuum section relative to the depth of the melt downstream from the vacuum section. The magnitude of this level difference is exacerbated by the viscous drag inherent in these systems. Because accelerated erosion of the side walls occurs at the elevation of the surface of the melt, significantly changing the level aggravates the erosion which, in turn, deteriorates the quality of the product glass.

A simpler structure is shown in U.S. Pat. No. 3,429,684, wherein batch materials are fed through a vacuum lock and melted at the top of a vertically elongated vacuum chamber. Varying throughput in that arrangement appears to require changing the amount of vacuum imposed in the chamber, which would disadvantageously alter the degree of refining achieved. Melting raw materials within the vacuum chamber is another disadvantage of that arrangement for three reasons. First, large volumes of foam would be created by carrying out the initial decomposition of the raw materials under vacuum, which would require a vessel large enough to contain the foam. Second, there is a danger that raw materials may follow a short circulation path to the output stream, thus avoiding adequate melting and refining. Third, carrying out the initial stages of melting and heating the melt to a refining temperature within the vacuum vessel require large amounts of heat to be supplied to the melt within the vessel. Such a major heat input to the vessel inherently induces convection currents within the melt that increase erosion of the walls, which leads to contamination of the refined product stream.

U.S. Pat. No. 4,195,982 discloses initially melting glass under elevated pressure and then refining the glass in a separate chamber at a lower pressure. Both chambers are heated.

A problem encountered with vacuum refining on any scale, whether continuous or batchwise, is the copious volume of foam that is sometimes produced, particularly at lower pressures. A large space above the liquid container must be provided to accommodate the foam. Since this head space must also be maintained gas-tight, its construction can be a significant economic drawback, particularly on a large scale process. As a result, the foam acts as a limiting factor to the degree of vacuum that can be utilized. It would be desirable to alleviate this constraint on vacuum refining processes without incurring major capital expenditures.

U.S. Pat. No. 3,350,185 discloses a technique for collapsing foam in a glass melting process at atmospheric pressure, wherein an abrupt change in the oxidizing or reducing condition of the combustion was found to cause foam to collapse.

SUMMARY OF THE INVENTION

In the present invention, the volume of foam accumulating in a vacuum refining chamber is controlled by applying agents to the foam that disrupt conditions in the foam, causing coalescence of bubbles and/or interrupting the surface tension in bubble membranes so that they burst. One group of agents found to be effective on glass foam are alkali metal compounds such as sodium hydroxide or sodium carbonate. Portions of foam in the vacuum chamber have been found to be slightly depleted in alkali content, presumably due to the relative volatility of alkalis in the reduced pressure environment. As a result, it is believed that the viscosity of the foam is higher than that of the body of molten glass, and that the foam is therefore more difficult to collapse. By applying alkali to the foam, its viscosity is lowered and bursting of bubbles is rendered easier. The addition of a viscosity altering agent to the foam also appears to disturb the bubble membranes, causing them to rupture. Some bursting due to direct impingement effects may also be involved. The alkali added preferably corresponds to the depleted species in kind as well as in amount so as to maintain the targeted product composition. For soda-lime-silica glass the most significant depletion is of sodium, and therefore the foam-breaking agent is preferably a sodium compound. The alkali metal compound may be added as a solid or in solution, and is directed onto the foam in the vacuum chamber either continuously or intermittently.

The preferred foam breaking agent of the present invention is water. As with the alkali, the water may disrupt the membranes of foam bubbles, either by droplet impact or by viscosity modification. Another theory is that spraying water onto the foam cools the upper portion of the foam, causing convective circulation within the foam. The increased motion due to the circulation is believed to accelerate coalescence of bubbles into larger bubbles that burst more readily. This effect is also believed to be present when using alkali solutions, and even when dry alkali compounds are deposited onto the foam. The use of water is advantageous because water is readily dissolved in the molten glass with little effect on the properties of the product glass, and because increasing the partial pressure of water vapor in the refining chamber does not effect the removal of relatively insoluble gases from the melt. It is also an advantage that water is easily handled and can b sprayed continuously or intermittently onto the foam at a readily regulated rate.

Combustible liquids such as alcohol or fuel oil could also be used as a foam breaking agent. In that case, the combustion of the liquid would add thermal energy to the system as an additional benefit.

An alternative arrangement for contacting the foam with the liquid foam breaking agents may entail injecting the liquid within the foam layer. This has the advantage of increased contact between the foam and the agent and ensures that virtually all of the liquid that vaporizes as it enters the reduced pressure chamber comes into contact with foam before being withdrawn by the vacuum system.

THE DRAWINGS

DETAILED DESCRIPTION

Figure 1:
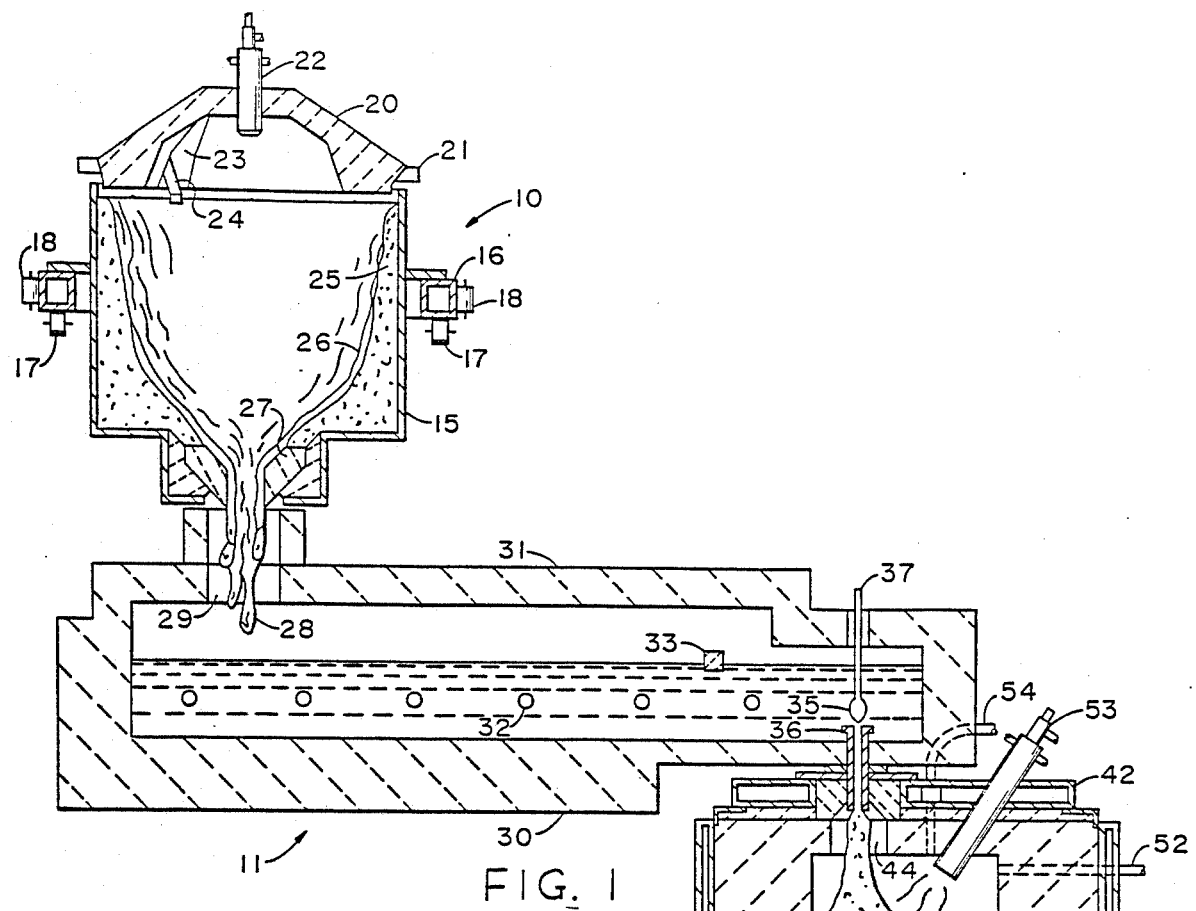
FIG. 1 is a vertical cross-section through three stages of a melting operation including a liquefaction stage, dissolving stage and a vacuum refining stage in accordance with a preferred embodiment of the present invention.

The detailed description will be set forth in conjunction with a method and apparatus specifically adapted for melting glass and similar glassy materials, but it should be understood that the invention is applicable to the processing of other materials as well.

Although not limited thereto, the present invention is advantageously used in conjunction with a vacuum refining system disclosed in copending, commonly assigned U.S. patent application Ser. No. 815,494 filed on Jan. 2, 1986. In that application an arrangement is disclosed whereby vacuum refining may be employed in a commercial scale, continuous glass melting process in a manner that advantageously and economically overcomes the drawbacks of the prior art. Molten glass is admitted to the vacuum refining chamber only after the majority of the thermal energy required for melting has been imparted to the melt so that little or no thermal energy need by supplied to the molten material contained within the vacuum chamber.

Preferably, no more heat is added at the vacuum stage than is necessary to compensate for heat loss through the vessel walls. At sufficiently high throughput rates, the vacuum chamber may be completely unheated. In preferred embodiments, batch materials are first liquefied at a stage specifically adapted for that step of the process, and the liquefied material is transferred to a second stage where dissolution of solid particles is essentially completed and the temperature of the material may be raised to a temperature suitable for refining. Subsequently, the molten material is passed to the vacuum chamber. As a result, a large portion of the gaseous by-products of melting are driven off before the material is subjected to vacuum, and the region of greatest gas evolution is separated from the refining zone, whereby materials undergoing the early stages of melting cannot become mixed with portions of the melt undergoing refining. Because most or all of the thermal requirement for melting has been satisfied before the material enters the vacuum refining stage, and heating of the refining stage can therefore be substantially avoided, excessive convection of the melt in the refining zone can be avoided. As a result, vessel erosion is reduced, and the probability of incompletely refined portions of the melt becoming mixed with more refined portions is reduced.

Other aspects of the preferred vacuum refining arrangement relate to advantages in throughput control. Liquefied material is metered into the upper end of the vacuum chamber through valve means and refined melt is passed from the lower end of the vacuum chamber through another valve arrangement. The height of liquid maintained within the vacuum chamber is preferably at least slightly greater than the height required to counterbalance the vacuum. Thus, the throughput rate can be controlled by means of the valves without altering the vacuum pressure in the chamber and without changing the liquid level within the chamber. Conversely, a range of vacuum pressures can be employed without changing the throughput rate. Aside from the valves, the system is provided with relatively low resistance to flow of the molten material therethrough.

The preferred configuration for the vacuum refining chamber is a vertically elongated vessel, most conveniently in the shape of an upright cylinder. This arrangement advantageously places the incoming material, laden with gas and usually foaming, at the top where the pressure is lowest and the gas can readily rise and escape from the liquid phase. As the molten material progresses downwardly toward an outlet at the bottom, the increasing pressure due to the depth of the melt in the vessel induces residual gases to remain in solution and decreases the volume of any small seeds that may remain. Dissolution is also aided by permitting the temperature to fall as the material progresses through the refining vessel.

In conventional melting of glass, sodium sulfate or calcium sulfate or other sources of sulfur are included in the batch materials to aid the melting and refining process. The presence of sulfur compounds in the melt has been found to be a problem when refining with vacuum because of the large volumes of foam induced and because of attack on the ceramic refractory walls of a vacuum refining vessel. But heretofore, effective melting and refining of glass have been difficult to achieve without the sulfur compounds. It is yet another advantageous aspect of the preferred vacuum fining arrangement that glass can be melted and refined to a high standard of quality with the use of little or no sulfur. This is feasible in the present invention because the melting and refining steps are carried out in discrete stages, whereby each stage may be carried out by a process adapted to minimize or avoid the use of refining aids.

Referring to FIG. 1, the overall melting process of the present invention preferably consists of three stages: a liquefaction stage 10, a dissolving stage 11 and a vacuum refining stage 12. Various arrangements could be employed to initiate the melting in the liquefaction stage 10, but a highly effective arrangement for isolating this stage of the process and carrying it out economically is that disclosed in U.S. Pat. No. 4,381,934, to which reference may be had for details of the preferred liquefaction stage embodiment. The basic structure of the liquefaction vessel is a drum 15 which may be fabricated of steel and has a generally cylindrical sidewall portion, a generally open top, and a bottom portion that is closed except for a drain outlet. The drum 15 is mounted for rotation about a substantially vertical axis, for example, by means of an encircling support ring 16 rotatably carried on a plurality of support wheels 17 and held in place by a plurality of aligning wheels 18. A substantially enclosed cavity is formed within the drum 15 by means of a lid structure 20 which is provided with stationary support by way of a peripheral frame 21, for example. The lid 20 may be constructed of refractory ceramic material and may take a variety of forms as may be known to those of skill in the refractory furnace construction art. The arrangement depicted in the figure is an upwardly domed, sprung arch construction fabricated from a plurality of refractory blocks. It should be understood that monolithic or flat suspended designs could be employed for the lid.

Heat for liquefying the batch material may be provided by one or more burners 22 extending through the lid 20. Preferably, a plurality of burners are arranged around the perimeter of the lid so as to direct their flames toward a wide area of the material within the drum. The burners are preferably water cooled to protect them from the harsh environment within the vessel. Exhaust gases may escape from the interior of the liquefaction vessel through an opening 23 in the lid. Advantageously the waste heat in the exhaust gases may be used to preheat the batch material in a preheating stage (not shown) such as that disclosed in U.S. Pat. No. 4,519,814.

Batch materials, preferably in a pulverulent state, may be fed into the cavity of the liquefying vessel by means of a chute 24, which in the embodiment depicted extends through the exhaust opening 23. Details of the feed chute arrangement may be seen in U.S. Pat. No. 4,529,428. The batch chute 24 terminates closely adjacent to the sidewalls of the drum 10, whereby batch material is deposited onto the inner sidewall portions of the drum. A layer 25 of the batch material is retained on the interior walls of the drum 10 aided by the rotation of the drum and serves as an insulating lining. As batch material on the surface of the lining 25 is exposed to the heat within the cavity, it forms a liquefied layer 26 that flows down the sloped lining to a central drain opening at the bottom of the vessel. The outlet may be fitted with a ceramic refractory bushing 27. A stream of liquefied material 28 falls freely from the liquefaction vessel through an opening 29 leading to the second stage 11.

The second stage may be termed the dissolving vessel because one of its functions is to complete the dissolution of any unmelted grains of batch material remaining in the liquefied stream 28 leaving the liquefaction vessel 10. The liquefied material at that point is typically only partially melted, including unmelted sand grains and a substantial gaseous phase.

The dissolving vessel 11 serves the function of completing the dissolution of unmelted particles in the liquefied material coming from the first stage by providing residence time at a location isolated from the downstream refining stage. Soda-lime-silica glass batch typically liquefies at a temperature of about 2100° F. (1150° C.) to 2200° F. (1200° C.) and enters the dissolving vessel 11 at a temperature of about 2100° F. (1200° C.) to about 2400° F. (1320° C.), at which temperature residual unmelted particles usually become dissolved when provided with sufficient residence time. The dissolving vessel 11 shown is in the form of a horizontally elongated refractory basin 30 with a refractory roof 31, with the inlet and outlet at opposite ends thereof so as to assure adequate residence time. The depth of molten material in the dissolving vessel may be relatively shallow in order to discourage recirculation of material.

Although the addition of substantial thermal energy is not necessary to perform the dissolving step, heating can expedite the process and thus reduce the size of the dissolving vessel 11. More significantly, however, it is preferred to heat the material in the dissolving stage so as to raise its temperature in preparation for the refining stage to follow. Maximizing the temperature for refining is advantageous for the sake of reducing glass viscosity and increasing vapor pressure of included gases. Typically a temperature of about 2800° F. (1520° C.) is considered desirable for refining soda-lime-silica glass, but when vacuum is employed to assist refining, lower peak refining temperatures may be used without sacrificing product quality. The amount by which temperatures can be reduced depends upon the degree of vacuum. Therefore, when refining is to be performed under vacuum in accordance with the present invention, the glass temperature need be raised to no more than 2700° F. (1480° C.), for example, preferably no more than 2600° F. (1430° C.), and optimally no more than 2500° F. (1370° C.) prior to refining. Peak temperature reductions on this order result in significantly longer life for refractory vessels as well as energy savings. Thus, liquefied material entering the dissolving vessel need be heated only moderately to prepare the molten material for refining. Combustion heat sources could be used in the dissolving stage 11, but it has been found that this stage lends itself well to electric heating, whereby a plurality of electrodes 32 may be provided as shown in the figure extending horizontally through the sidewalls. Heat is generated by the resistance of the melt itself to electric current passing between electrodes in the technique conventionally employed to electrically melt glass. The electrodes 32 may be carbon or molybdenum of a type well known to those of skill in the art.

A valve controlling the flow of material from the dissolving stage 11 to the refining stage 12 is comprised of a plunger 35 axially aligned with a drain tube 36. The shaft 37 of the plunger extends through the roof 31 of the dissolving vessel so as to permit control over the gap of the plunger 35 and the tube 36 to thereby modulate the rate of flow of material into the refining stage. The valve tube 36 may be fabricated of a refractory metal such as platinum and is sealingly fitted into an orifice 44 at the upper end of the refining vessel.

The refining stage 12 preferably consists of a vertically upright vessel that may be generally cylindrical in configuration, having an interior ceramic refractory lining 40 shrouded in a gas-tight water-cooled casing. The casing may include a double walled, cylindrical sidewall member 41 having an annular water passageway therebetween and circular end coolers 42 and 43. Any suitable cooling arrangement may be employed. A layer of insulation (not shown) may be provided between the lining 40 and the jacket 41.

As the molten material passes through the tube 36 and encounters the reduced pressure within the refining vessel, gases included in the melt expand in volume creating a foam layer 50 resting on a body of liquid 51. As foam collapses it is incorporated into the liquid body 51. Subatmospheric pressure may be established within the refining vessel through a vacuum conduit 52 extending through the upper portion of the vessel. Optionally, a burner 53 may be provided to heat the upper portion of the vessel interior.

Refined molten material is drained from the bottom of the refining vessel 12 by way of a drain tube 55 of a refractory metal such as platinum. The drain tube 55 preferably extends above the surface of the refractory bottom section 56 within which it is mounted to prevent any debris from entering the output stream. The bottom section 56 may be provided with reduced thickness adjacent to the tube 55 so as to reduce the insulating effect on the tube, thereby permitting the temperature of the tube to be elevated to prevent freezing of material within the tube. Leakage around the tube is prevented by a water cooler 57 under the bottom section 56. The flow rate of molten material from the drain tube 55 is controlled by a conical throttle member 58 carried at the end of a stem 59. The stem 59 is associated with mechanical means (not shown) to adjust the elevation of the throttle member 58 and thus adjust the gap between the throttle member and the tube 55 so as to control the flow rate therefrom. A molten stream 60 of refined material falls freely from the bottom of the refining vessel and may be passed to a forming station (not shown) where it may be shaped to the desired product. Refined glass, for example, may be passed to a float glass forming chamber where the molten glass floats on a pool of molten metal to form a flat sheet of glass.

Although various shapes could be employed, the refining vessel 12 is preferably cylindrical in configuration. The cylindrical shape is advantageous for the sake of constructing a gas-tight vessel. The ratio of interior surface contact area to volume is also minimized with a circular cross-section. Compared to a conventional open hearth type recirculating refiner, only a fraction of the refractory contact area is entailed by the cylindrical vacuum refiner of the present invention.

The height of molten material 51 retained in the refiner 12 is dictated by the level of vacuum imposed in the chamber. The pressure head due to the height of the liquid must be sufficient to establish a pressure equal to or greater than atmospheric at the outlet to permit the material to drain freely from the vessel. The height will depend upon the specific gravity of the molten material, which for soda-lime-silica glass at the temperatures involved is about 2.3. A height in excess of the minimum required to offset the vacuum may be desired to account for fluctuations in atmospheric pressure, to permit variation of the vacuum, and to assure steady flow through the outlet. In the preferred embodiments of the present invention, a substantial excess height is provided so that the outlet flow rate is not determined by the vacuum pressure, but rather by mechanical valve means. Such an arrangement permits the throughput rate and the vacuum pressure to be varied independently of each other. Alternatively, the pressure at the outlet could be below atmospheric if the outlet is provided with pump means to overcome the pressure differential. An example of a pump that is intended for use with molten glass is disclosed in U.S. Pat. No. 4,083,711.

The benefits of vacuum on the refining process are attained by degrees; the lower the pressure, the greater the benefit. Small reductions in pressure below atmospheric may yield measurable improvements, but to economically justify the vacuum chamber the use of substantially reduced pressures are preferred. Thus, a pressure of no more than one-half atmosphere is preferred for the appreciable refining improvements imparted to soda-lime-silica flat glass. Even better results are obtained at one-third atmosphere or less. Absolute pressures less than 100 torr (e.g 20–50 torr) are preferred in order to yield commercial float glass quality of about one seed per 1,000 to 10,000 cubic centimeters. Seeds less than 0.01 millimeter in diameter are considered imperceptible and are not included in the seed counts.

The foam breaking agents of the present invention may be injected into the refining vessel by means of a tube 54 extending to the upper portion of the vacuum headspace, for example through the top cooler 42 as shown in the drawing. The tube may be provided with a water cooled jacket (not shown) to extend ifs life. Liquids such as water can be sprayed into the vessel by way of the tube 54 continuously or intermittently. In one example, the foam level was satisfactorily controlled while refining soda-lime-silica glass at a pressure of one-fourth atmosphere by injecting water at a rate of about 3 gallons per ton of glass produced. At a pressure of 40 torr a rate of one half gallon per ton of glass was satisfactory. For introducing solid foam-breaking materials into the headspace of the refining vessel, a straight, water cooled tube with an air lock may be provided through the upper cooler 42. The amount of foam-breaking material to be used depends upon a number of factors and the circumstances of the particular case. The rate of foam generation and the headspace volume available to contain the foam are obviously factors to be considered. The rate of foam generation, in turn, depends upon the throughput rate, the level of vacuum, the temperature and gas content of the melt, and the amount of gas-producing refining aids present in the melt. The foam need not be totally suppressed, but rather it is preferred to employ the minimum amount of foam breaking agent to prevent an unacceptably large volume of foam accumulation. Using unnecessarily large amounts of foam breaking material would be undesirable due to its cooling effect on the melt. At the order of magnitude of the examples given above, the amount of water injected has been found to have an insignificant effect on the energy efficiency of the system. An example of an undesirably large volume of foam would be one that caused foam to enter the vacuum conduit 52 in the embodiment shown in the drawings.

Figure 2:
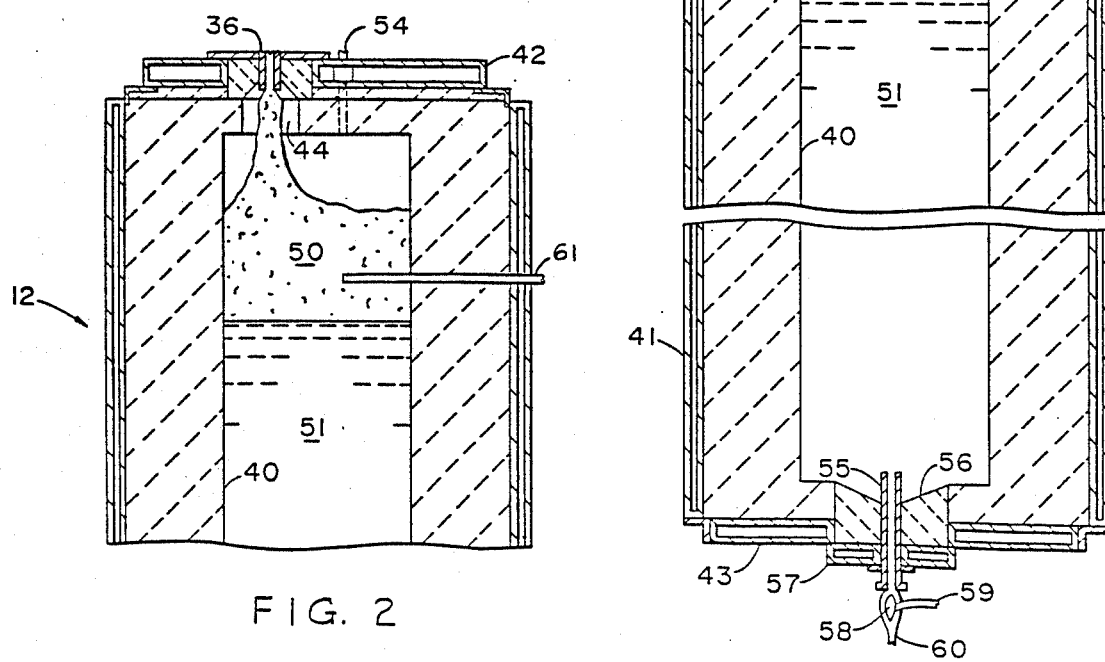
FIG. 2 is a vertical cross-section through the upper portion of the vacuum refining stage, depicting an alternative embodiment for carrying out the present invention.

Referring now to FIG. 2, there is shown an alternative arrangement for injecting the water or other foam breaking liquid into the refining vessel 12. In that embodiment a tube 61 carrying the liquid terminates within the foam layer 50. The tube 61 may extend into the foam from above or may extend substantially horizontally from an opening in the side wall of the vessel 12 at an appropriate elevation as shown in FIG. 2. The tube 61 may be provided with a water cooled jacket to enhance its preservation. By discharging the foam breaking liquid within the layer of foam, the vapor that results is in direct contact with and percolates through the foam layer, thereby enhancing contact therebetween. The pressure difference between the interior and exterior of the vessel will draw the liquid into the vessel. The amount of liquid injected into the foam and the foam breaking effect may be modulated by bleeding controlled amounts of air (or other gas) into the tube 61.

Melting and fining aids such as sulfur or fluorine compounds are conventionally included in glass batches but produce a substantial portion of the undesirable emissions in exhaust gas from glass melting furnaces. Their elimination would be desirable, but to attain the highest levels of quality, particularly for flat glass standards, use of the aids has been considered necessary. Furthermore, sulfur sources (e.g., sodium sulfate, calcium sulfate) have been found to cause excessive foaming under vacuum. Typically, flat glass batch includes sodium sulfate in the amounts of about 5 to 15 parts by weight per 1000 parts by weight of the silica source material (sand), with about 10 parts by weight considered desirable to assure adequate refining. When operating in accordance with the present invention, however, it has been found preferable to restrict the sodium sulfate to two parts by weight to maintain a manageable level of foaming, and yet it has been found that refining is not detrimentally affected. Most preferably, the sodium sulfate is utilized at no more than one part per 1000 parts sand, with one-half part being a particularly advantageous example. These weight ratios have been given for sodium sulfate, but it should be apparent that they can be normalized to other sulfur sources by molecular weight ratios. Omitting any deliberate addition of refining aids is also feasible, but trace amounts of sulfur in some mineral batch materials sometimes cause minor amounts of sulfur to be present.

Other variations as would be known to those of skill in the art may be resorted to within the scope of the present invention as defined by the claims that follow.

1. A method of refining glassy materials or the like wherein a volume of the material in a molten state is retained in a vessel, subatmospheric pressure is maintained in the vessel above the molten material so as to assist refining of the material, whereby foam is present above the material in the vessel, characterized by depositing onto the foam substances that accelerate collapse of the foam selected from the group consisting of water, alkali metal compounds, and solutions thereof.

2. The method of claim 1 wherein the foam collapsing substance is water.

3. The method of claim 1 wherein the alkali metal compounds are sodium compounds.

4. The method of claim 3 wherein the foam collapsing substance is selected from the group consisting of sodium hydroxide and sodium carbonate.

5. The method of claim 1 wherein the pressure in the vessel is no more than one-half of atmospheric pressure.

6. The method of claim 1 wherein the pressure is no more than 100 torr.

7. The method of claim 1 wherein the material being refined is soda-lime-silica glass, and is initially provided with a sulfur source as a refining aid in an amount no greater than an equivalent amount of 2 parts by weight sodium sulfate per 1000 parts by weight of silica source material.

8. The method of claim 1 wherein the foam collapsing substance is fed continuously onto the foam.

9. The method of claim 1 wherein the foam collapsing substance is fed intermittently onto the foam.

10. The method of claim 1 wherein the material is liquefied prior to entering the vessel.

11. The method of claim 7 wherein the material has no deliberate inclusion of a sulfur-containing refining aid.

12. The method of claim 1 wherein the collapse of foam is accelerated by spraying water toward the foam.

13. The method of claim 1 wherein the foam collapsing substance is liquid.

14. A method of refining glassy materials or the like wherein a volume of the material in a molten state is retained in a vessel, subatmospheric pressure is maintained in the vessel above the molten material so as to assist refining of the material, whereby a foam layer is present above the material in the vessel, characterized by injecting a substantially non-combustible fluid into the foam layer so as to induce collapse of foam.

15. The method of claim 14 wherein the fluid includes water.

16. The method of claim 14 wherein the fluid includes a gas.

17. The method of claim 15 wherein the fluid includes a gas.

18. The method of claim 15 wherein the fluid includes alkali metal compounds.

19. The method of claim 14 wherein the injection of the fluid is in a substantially horizontal direction.

20. A method of refining glassy materials or the like wherein a volume of the material in a molten state is retained in a vessel, subatmospheric pressure is maintained in the vessel above the molten material so as to assist refining of the material, whereby a foam layer is present above the material in the vessel, characterized by discharging fluid from an orifice submerged in the foam layer so as to induce collapse of foam.

21. The method of claim 20 wherein the fluid includes water.

22. The method of claim 20 wherein the fluid includes a gas.

23. The method of claim 21 wherein the fluid includes a gas.

24. The method of claim 21 wherein the fluid includes alkali metal compounds.

25. The method of claim 20 wherein the fluid is substantially non-combustible.

* * * * *